US007016819B1

(12) United States Patent  (10) Patent No.: US 7,016,819 B1
Lui  (45) Date of Patent: Mar. 21, 2006

(54) SEMICONDUCTOR DEVICE SIMULATION METHOD AND SIMULATOR

(75) Inventor: Basil Lui, Cambridge (GB)

(73) Assignee: Seiko Epson Corporation, Tokyo (JP)

( * ) Notice: Subject to any disclaimer, the term of this patent is extended or adjusted under 35 U.S.C. 154(b) by 788 days.

(21) Appl. No.: 09/762,589

(22) PCT Filed: Jun. 15, 2000

(86) PCT No.: PCT/GB00/02321

§ 371 (c)(1), (2), (4) Date: Mar. 30, 2001

(87) PCT Pub. No.: WO00/77533

PCT Pub. Date: Dec. 21, 2000

(30) Foreign Application Priority Data

Jun. 15, 1999  (GB) .................................. 9913915

(51) Int. Cl.
  *G06F 17/10* (2006.01)
  *G06F 17/50* (2006.01)
(52) U.S. Cl. ................................ 703/2; 703/13; 716/4
(58) Field of Classification Search ................ 703/6, 703/13, 14, 2; 257/366; 438/158, 172; 716/4
See application file for complete search history.

(56) References Cited

U.S. PATENT DOCUMENTS

| 5,266,825 A | * | 11/1993 | Tsukada et al. | ............. | 257/366 |
| 5,989,947 A | * | 11/1999 | Dilger et al. | ............... | 438/172 |
| 6,066,517 A | * | 5/2000 | Batra et al. | ................. | 438/158 |

OTHER PUBLICATIONS

Lui et al., "A new generation -recombination model for device simulation including the poole-frenkel effect and phonon-assisted tunneling", Solid-State Electronics, vol. 41, No. 4, pp 575-583, 1997.

(Continued)

*Primary Examiner*—Paul L. Rodriguez
*Assistant Examiner*—Dwin Craig
(74) *Attorney, Agent, or Firm*—Oliff & Berridge, PLC

(57) ABSTRACT

An automated simulation method for determining the enhanced generation-recombination rate due to trap-to-band tunnelling in a semiconductor device using the Dirac coulombic tunnelling integral and to a simulator for carrying out the method are disclosed. The method and simulator are, for example, particularly useful in the modelling of characteristics such as leakage current in polysilicon TFTs, which leakage current can, for example, seriously degrade pixel voltage in active matrix display devices. The simulator embodies the method, which method comprises the steps of: assigning the variable C to the ratio of the Poole-Frenkel barrier lowering energy ($\Delta E_{fp}$) divided by the energy range for which tunnelling can occur ($\Delta E_n$); assigning the value (C+1)/2 to a variable v and performing a second order Taylor's series expansion of the Dirac coulombic tunnelling integral around v to determine a maximum value ($u_{max}$) for the variable u of the integral; determining if the value for $u_{max}$ is less than C, is between C and 1 or is more than 1; assigning the value of C to the variable v if $u_{max}$ is less than C; assigning the value f $u_{max}$ to the variable v if $u_{max}$ is between C and 1; assigning the value of 1 to the variable v if $u_{max}$ is more than 1; reducing the Taylor's series expansion of the Dirac coulombic tunnelling integral to an error function; reducing the error function to simple exponential functions by applying rational approximations to the error function; and calculating the enhanced generation recombination rate due to trap-to-band tunnelling in a semiconductor device using the said simple exponential functions.

9 Claims, 9 Drawing Sheets

OTHER PUBLICATIONS

Pelaz et al., "The Poole-Frenkel Effect in 6H-SiC Diode Characteristics", IEEE Transactions on Electron Devices, vol. 41, No. 4, Apr. 1994, pp. 587-591.

Reisch, "Tunneling-Induced Leakage Currents in pn Junctions", Archiv fur Elektronik und Uebertragungstechnuk, vol. 44, No. 5, Sep.-Oct. 1990, pp. 368-382.

* cited by examiner

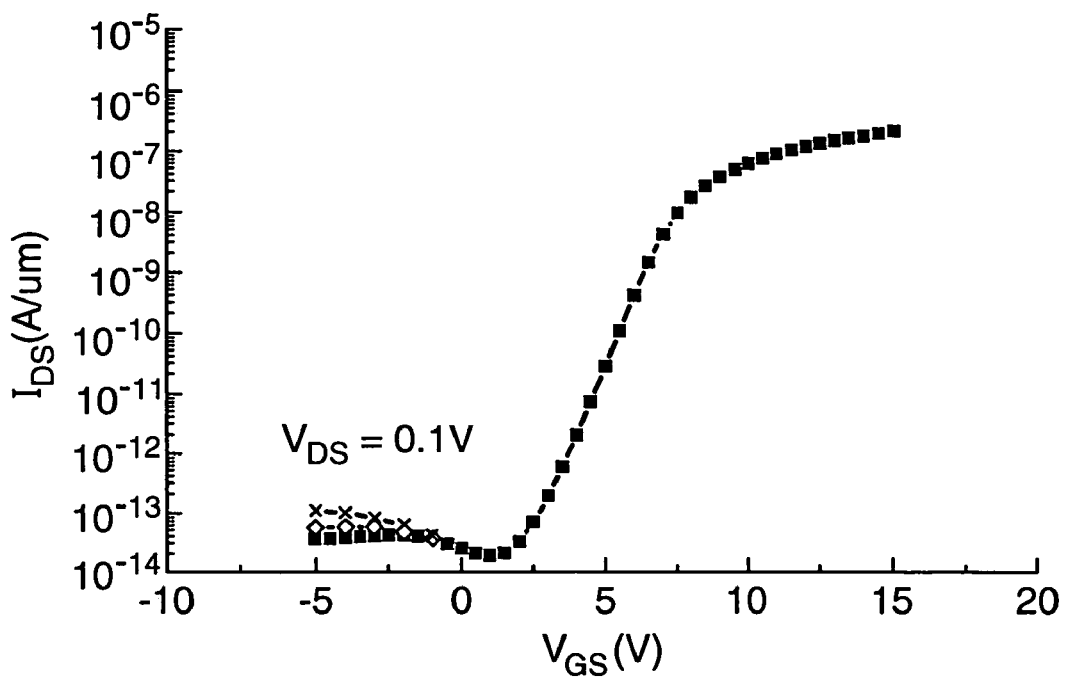

Fig.9.

$$\Gamma_n^{Coul} = \frac{\Delta E_n}{kT} \int_{\frac{\Delta E_{fp}}{\Delta E_n}}^{I} \exp\left\{\frac{\Delta E_n}{kT} u - K_n u^{\frac{3}{2}}\left[1 - \left(\frac{\Delta E_{fp}}{u \Delta E_n}\right)^{\frac{5}{3}}\right]\right\} du \qquad (1)$$

$$\Gamma_n^{Coul} = \frac{\Delta E_n}{kT} \int_{\frac{\Delta E_{fp}}{\Delta E_n}}^{I} \exp\left\{\frac{\Delta E_n}{kT} u - K_n u^{\frac{3}{2}} + K_n \left(\frac{\Delta E_{fp}}{u \Delta E_n}\right)^{\frac{5}{3}} u^{-\frac{1}{6}}\right\} du. \qquad (2)$$

$$A = \frac{\Delta E_n}{kT}, \ B = K_n, \ C = \frac{\Delta E_{fp}}{\Delta E_n}, \ D = BC^{\frac{5}{3}}. \qquad (3)$$

$$\Gamma_n^{Coul} = A \int_c^I \exp\left\{Au - Bu^{\frac{3}{2}} + Du^{-\frac{1}{6}}\right\} du. \qquad (4)$$

$$\Gamma_n^{Coul} = A \int_c^I \exp\left[f(u)\right] du. \qquad (5)$$

$$f(u) = Au - Bu^{\frac{3}{2}} + Du^{-\frac{1}{6}}. \qquad (6)$$

$$f(u) \approx f(v) + f'(v)(u - v) + \frac{f''(v)}{2}(u - v)^2, \qquad (7)$$

Fig.9(cont.a)

$$f(v) = Av - Bv^{\frac{3}{2}} + Dv^{-\frac{1}{6}}. \tag{8}$$

$$f'(v) = A - \frac{3}{2}Bv^{\frac{1}{2}} - \frac{1}{6}Dv^{-\frac{7}{6}}, \tag{9}$$

$$f''(v) = -\frac{3}{4}Bv^{-\frac{1}{2}} + \frac{7}{36}Dv^{-\frac{13}{6}}. \tag{10}$$

$$f(u) \approx \frac{f''(v)}{2}u^2 + [f'(v) - vf''(v)]u + \left[v^2\frac{f''(v)}{2} - vf'(v) + f(v)\right] \tag{11}$$

$$f(u) \approx f''(v)u + [f'(v) - vf''(v)] = 0,$$

$$u_{max} = \frac{f'(v) - vf''(v)}{f''(v)}$$

$$f(u) \approx -(AIu^2 + AIIu + AIII) \tag{12}$$

$$AI = -\frac{f''(v)}{2}. \tag{13}$$

$$AII = -[f'(v) - vf''(v)] \tag{14}$$

$$AIII = -\left[v^2\frac{f''(v)}{2} - vf'(v) + f(v)\right]. \tag{15}$$

$$f(u) \approx -AI\left[\left(u + \frac{AII}{2AI}\right)^2 + \left(\frac{AIII}{AI} - \left(\frac{AII}{2AI}\right)^2\right)\right]. \tag{16}$$

$$\Gamma_n^{Coul} = A\int_c^l \exp[f(u)]\,du \tag{17}$$

Fig.9(cont.b)

$$\Gamma_n^{Coul} = A \exp\left[-AI\left(\frac{AIII}{AI} - \left(\frac{AII}{2AI}\right)^2\right)\right] \int_c^I \exp\left[-\sqrt{AI}\left(u + \frac{AII}{2AI}\right)\right]^2 du. \quad (18)$$

$$t = \sqrt{AI}\left(u + \frac{AII}{2AI}\right), \quad (19)$$

$$u = C, \; t_l = \sqrt{AI}\left(C + \frac{AII}{2AI}\right), \quad (20)$$

$$u = I, \; t_u = \sqrt{AI}\left(I + \frac{AII}{2AI}\right), \quad (21)$$

$$du = \frac{1}{\sqrt{AI}} dt. \quad (22)$$

$$\Gamma_n^{Coul} = \frac{A}{\sqrt{AI}} \exp\left[-AI\left(\frac{AIII}{AI} - \left(\frac{AII}{2AI}\right)^2\right)\right] \int_{t_l}^{t_u} e^{-t^2} dt. \quad (23)$$

$$\int_{t_l}^{t_u} e^{-t^2} dt = \frac{\sqrt{\pi}}{2} [erf(t_u) - erf(t_l)]. \quad (24)$$

$$erf(x) = 1 - (a_1 t + a_2 t^2 + a_3 t^3 + a_4 t^4 + a_5 t^5)e^{-x^2},$$

$$t = \frac{1}{1 + px},$$

$a_1 = 0.254829592;$
$a_2 = -0.284496736;$
$a_3 = 1.421413741;$
$a_4 = -1.453152027;$
$a_5 = 1.061405429;$
$p = 0.3275911;$ \quad (25)

Fig.9(cont.c)

$$\Gamma_n^{Coul} = \frac{A}{2}\sqrt{\frac{\pi}{AI}} \left[ \frac{a_1}{(1+pt_l)} + \frac{a_2}{(1+pt_l)^2} + \frac{a_3}{(1+pt_l)^3} + \frac{a_4}{(1+pt_l)^4} + \frac{a_5}{(1+pt_l)^5} \right] \exp(-C^2 AI - CAII - AIII)$$

$$- \frac{A}{2}\sqrt{\frac{\pi}{AI}} \left[ \frac{a_1}{(1+pt_u)} + \frac{a_2}{(1+pt_u)^2} + \frac{a_3}{(1+pt_u)^3} + \frac{a_4}{(1+pt_u)^4} + \frac{a_5}{(1+pt_u)^5} \right] \exp(-AI - AII - AIII) \quad (26)$$

$$AI = -\frac{f''(v)}{2}, \quad AII = -[f'(v) - vf''(v)], \quad AIII = -\left[ v^2 \frac{f''(v)}{2} - vf'(v) + f(v) \right],$$

$$t_l = \sqrt{AI} \left( C + \frac{AII}{2AI} \right), \quad t_u = \sqrt{AI} \left( 1 + \frac{AII}{2AI} \right),$$

$$f(v) = Av - Bv^{\frac{3}{2}} + Dv^{-\frac{1}{6}},$$

$$f'(v) = A - \frac{3}{2} Bv^{\frac{1}{2}} - \frac{1}{6} Dv^{-\frac{7}{6}},$$

$$f''(v) = -\frac{3}{4} Bv^{-\frac{1}{2}} + \frac{7}{36} Dv^{-\frac{13}{6}},$$

Fig.9(cont.d)

$$A = \frac{\Delta E_n}{kT}, B = K_n, C = \frac{\Delta E_{fp}}{\Delta E_n}, D = BC^{\frac{5}{3}}.$$

$v = C$ (for $u_{max} < C$, case 1), $v = u_{max}$ (for $C < u_{max} < I$, case 2), $v = I$ (for $u_{max} \geq 1$, case 3), $$u_{max} = \frac{f'(v) - vf''(v)}{f''(v)} \text{ for } v = \frac{C+1}{2}.$$

$$\Gamma_n^{Coul} = \frac{A}{2}\sqrt{\frac{\pi}{AI}} \left( \frac{a_1}{(1+pt_l)} + \frac{a_2}{(1+pt_l)^2} + \frac{a_3}{(1+pt_l)^3} + \frac{a_4}{(1+pt_l)^4} + \frac{a_5}{(1+pt_l)^5} \right) exp(-C^2AI - CAII - AIII)$$
$$- \frac{A}{2}\sqrt{\frac{\pi}{AI}} \left( \frac{a_1}{(1+pt_u)} + \frac{a_2}{(1+pt_u)^2} + \frac{a_3}{(1+pt_u)^3} + \frac{a_4}{(1+pt_u)^4} + \frac{a_5}{(1+pt_u)^5} \right) exp(-AI - AII - AIII)$$
$$\pm \frac{A}{2}\sqrt{\frac{\pi}{AI}} exp\left(-AIII + \frac{AII^2}{4AI}\right). \quad (27)$$

SEMICONDUCTOR DEVICE SIMULATION METHOD AND SIMULATOR

BACKGROUND

The present invention relates to an automated simulation method for determining the enhanced generation-recombination rate due to trap-to-band tunnelling in a semiconductor device using the Dirac coulombic tunnelling integral and to a simulator for carrying out the method.

The enhanced generation-recombination rate due to trap-to-band tunnelling in a semiconductor device is considered to be responsible for a number of important effects in semiconductor devices, including the anomalous leakage current in polysilicon Thin Film Transistors (TFTs). Polysilicon TFTs are widely used for example in active matrix display devices. The anomalous leakage current of the TFTs can severely degrade the pixel voltage in such display devices. Thus, this is one example of the commercial importance of an automated simulation method and simulator of the type provided by the present invention.

SUMMARY

Having regard to the complexity and cost of the fabrication processes for manufacturing semiconductor devices, it is highly desirable if not essential for the design and performance evaluation of such devices to be undertaken using mathematical simulations, often referred to as modelling. It is clearly crucial for such modelling to be able to provide accurate calculation of the enhanced generation-recombination rate due to trap-to-band tunnelling, and hence the leakage current, within a semiconductor device. Consequently, considerable effort has previously been spent in developing methods of calculating the enhanced generation-recombination rate due to trap-to-band tunnelling in a semiconductor device. Such methods are embodied in computer programs which are sold as staple commercial products by or on behalf of their developers to designers and manufacturers of semiconductor devices.

In a paper submitted in 1996 and published in 1997 (Solid State Electronics Vol. 41, No. 4, pp 575–583 1997) the inventors hereof presented a generation-recombination model for device simulation including the Poole-Frenkel effect and phonon-assisted tunnelling. The model is conveniently referred to as the Dirac Coulombic Tunnelling Integral, which is recited as equation 1 in FIG. 9 hereof.

As noted in the above mentioned published paper, the Dirac Coulombic Tunnelling Integral is applicable to semiconductor devices generally. However, as also noted above, an important category of semiconductor devices is thin film transistors (TFTs) and such a device will herein after be used for ease of reference, but by way of one example only of a semiconductor device. Similarly, for ease of reference, the leakage current in a TFT will be referred to herein as a non-limiting example of the enhanced generation-recombination rate due to trap-to-band tunnelling in a semiconductor device.

FIG. 1 hereof is a graph showing voltage current characteristics of a polysilicon TFT. As seen in FIG. 1 when $V_{DS}$ is high (5.1V), the leakage current ($I_{Ds}$) increases with decreasing $V_{GS}$ (below 0V). The magnitude of this leakage current poses as a significant problem, for example, when the TFT is employed as a switching pixel transistor in active matrix LCDs. Several field-assisted generation mechanisms have been proposed to explain this 'off' current.

A quantitative analysis of the leakage current in polysilicon TFTs based on the combination of current-voltage measurements as a function of temperature and 2-D simulations was carried out as long ago as 1995. This analysis shows that the dominant generation mechanism is pure trap-to-band tunnelling below 240K and phonon-assisted trap-to-band tunnelling at higher temperatures. The need to include Poole-Frenkel (PF) barrier lowering in trap-to-band phonon-assisted tunnelling was demonstrated for polysilicon pn junctions as long ago as 1982. Apart from further enhancing the emission rate for trap-to-band phonon-assisted tunnelling, the PF effect also plays a significant role in enhancing pure thermal emissions at low fields.

The PF effect consists of the lowering of a coulombic potential barrier due to the electric field applied to a semiconductor. For a trap to experience the effect, it must be neutral when filled (charged when empty). Such a trap potential is long ranged and is often referred to as a coulombic well. A trap that is neutral when empty will not experience the effect because of the absence of the coulomb potential. Such a trap potential is short ranged and is known as a Dirac well. Without the PF effect, the calculated emission rate is at least one order of magnitude lower than what is needed to fit the experimental data in polysilicon TFTs. By using a 2-D simulator, based on the known trap-to-band phonon-assisted tunnelling model (Hurkx et al) available since 1992, the inventors hereof were unable to simulate the leakage currents in polysilicon TFTs accurately. This is because the conventional model takes only into account Dirac wells and deliberately neglects the PF effect. Moreover, the many attempts at modelling of trap-to-band phonon-assisted tunnelling inclusive of the PF effect, which have been made since development of the original theory by Vincent et al in 1979, do not address a key problem: the implementation in a device simulator. The work by Vincent et al in 1979 gives evidence both theoretically and experimentally that the electric field in a junction has a large influence on the thermal emission rate of deep levels (midgap states). This influence can be quantitatively explained in a model of phonon-assisted tunnelling emission. Tunnelling is very sensitive to the barrier height and is therefore expected to be considerably affected by the PF barrier lowering.

As noted above, in 1996 the present inventors presented a new quantum mechanical tunnelling generation-recombination (G-R) model, conveniently referred to as the Dirac Coulombic Tunnelling Integral, which takes into full rigorous account the PF barrier lowering and is suitable for implementation in a device simulator. This G-R model is consistently formulated for the entire range of electric fields and temperatures. At high fields, the dominant mechanism is found to be trap-to-band phonon-assisted tunnelling inclusive of the PF effect; while at low fields, the model will reduce to that of the standard Shockley-Read-Hall (SRH) thermal G-R.

However, a practical implementation of the model into commercial device simulators has not until this invention been presented despite the length of time since presentation of the Dirac Coulombic Tunnelling Integral and despite the high commercial value of such a practical implementation.

According to a first aspect of the present invention there is provided an automated simulation method for determining enhanced generation recombination rate due to trap-to-band tunnelling in a semiconductor device using the Dirac coulombic tunnelling integral, comprising the steps of:

assigning the variable C to the ratio of the Poole-Frenkel barrier lowering energy ($\Delta E_{fp}$) divided by the energy range for which tunnelling can occur ($\Delta E_n$);

assigning the value (C+1)/2 to a variable v and performing a second order Taylor's series expansion of the Dirac coulombic tunnelling integral around v to determine a maximum value ($u_{max}$) for the variable u of the integral;

determining if the value for $u_{max}$, is less than C, is between C and 1 or is more than 1;

assigning the value of C to the variable v if $u_{max}$ is less than C;

assigning the value of $u_{max}$ to the variable v if $u_{max}$ is between C and 1;

assigning the value of 1 to the variable v if $U_{max}$ is more than 1;

reducing the Taylor's series expansion of the Dirac coulombic tunnelling integral to an error function;

reducing the error function to simple exponential functions by applying rational approximations to the error function; and calculating the enhanced generation recombination rate due to trap-to-band tunnelling in a semiconductor device using the said simple exponential functions.

According to a second aspect of the present invention there is provided a simulator for determining enhanced generation recombination rate due to trap-to-band tunnelling in a semiconductor device using the Dirac coulombic tunnelling integral, comprising:

means storing a variable C having a value equal to the ratio of the Poole-Frenkel barrier lowering energy ($\Delta E_{fp}$) divided by the energy range for which tunnelling can occur ($\Delta E_n$);

means which assign the value (C+1)/2 to a variable v and perform a second order Taylor's series expansion of the Dirac coulombic tunnelling integral around v to determine a maximum value ($u_{max}$) for the variable u of the integral;

means which determine if the value for $u_{max}$ is less than C, is between C and 1 or is more than 1;

means which assign the value of C to the variable v if $u_{max}$ is less than C;

means which assign the value of $u_{max}$ to the variable v if $u_{max}$ is between C and 1;

means which assign the value of 1 to the variable v if $u_{max}$ is more than 1;

means storing simple exponential functions derived from applying rational approximations to an error function obtained by reducing the Taylor's series expansion of the Dirac coulombic tunnelling integral; and means which calculate the enhanced generation recombination rate due to trap-to-band tunnelling in a semiconductor device using the said simple exponential functions.

Although possible in theory, even with the fastest computers available today, using numerical integration methods to solve the Dirac coulombic tunnelling integral for every trap level in every element in a finite element package will take so much computation time that such an approach can not be used for a commercial and practicable implementation. The present invention enables such a commercial and practicable implementation. Moreover, the present invention can provide high levels of accuracy in the automated modelling of the enhanced generation-recombination rate due to trap-to-band tunnelling in a semiconductor device.

BRIEF DESCRIPTION OF THE DRAWINGS

Embodiments of the present invention will now be described in more detail by way of example only and with reference to the accompanying drawings, in which:

FIG. 8 is a graph illustrating the performance of the present invention; and

FIG. 9 lists equations useful in explaining embodiments of the present invention.

DETAILED DESCRIPTION OF EMBODIMENTS

Starting from the Dirac coulombic tunnelling integral, given as Eqn. (1) in FIG. 9, it is possible for the integral to be expressed in the form shown as Eqn. (2). Applying the simplification shown in Eqn. (3) leads to Eqn. (4). Eqn. (4) can be further simplified to give Eqn. (5), where the function $f(u)$ is as defined in Eqn. (6).

Most of the contribution to the expression of Eqn. (5) can be expected to arise from the condition when the function $f(u)$ is largest. This condition should be considered for the three cases which have distinct characteristics namely, Case 1 when the electric field is low; Case 2 when the electric field is moderate and Case 3 when then the electric field is high. These three distinct conditions are illustrated in FIGS. 2, 3 and 4 respectively.

Figure 2:
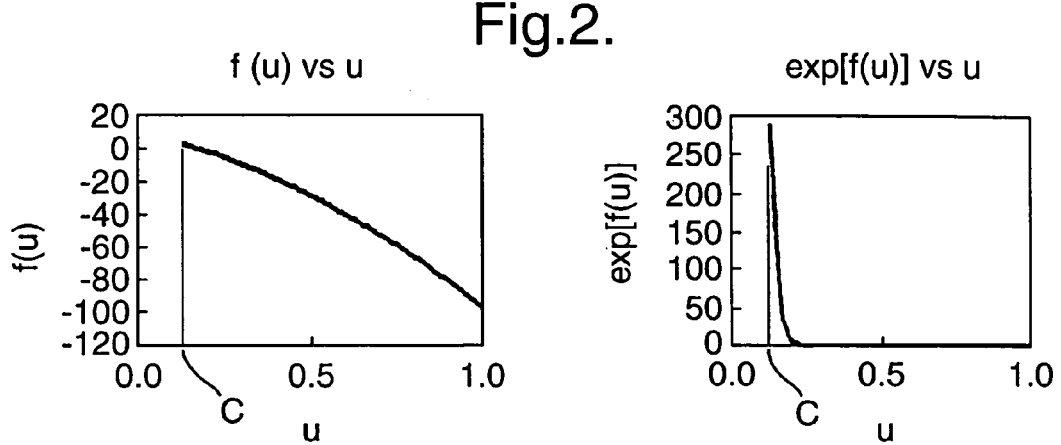
FIG. 2 shows two graphs illustrating a low field condition.

FIG. 2 is based on a low field value (F) of $F=1\times10^7 Vm^{-1}$ for $\Delta E_n=0.5 eV$. The maximum of $f(u)$ occurs at C, giving the maximum contribution to $\exp[f(u)]$ at C as well.

Figure 3:
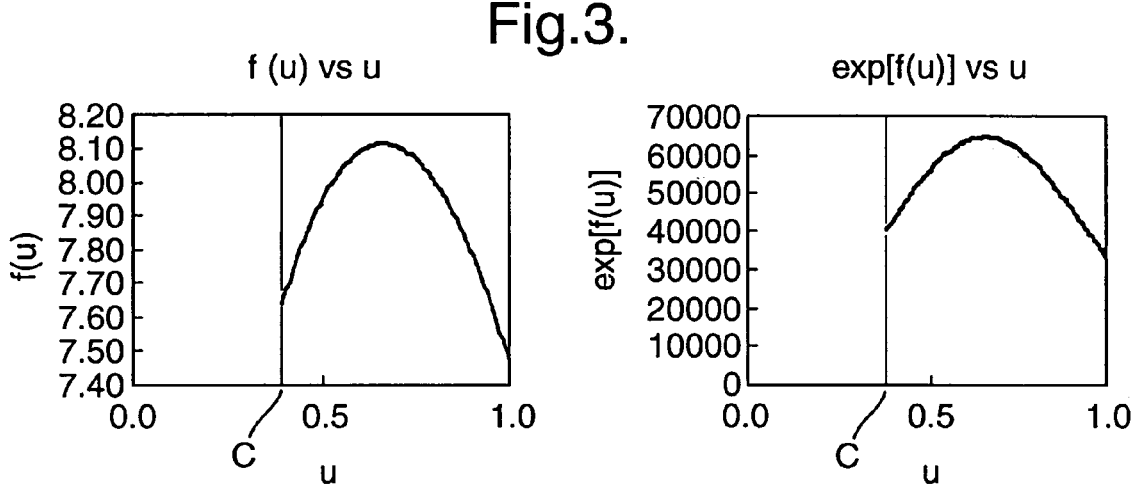
FIG. 3 shows two graphs illustrating a moderate field condition.

FIG. 3 is based on a moderate field value (F) of $F=7\times10^7 Vm^{-1}$ for $\Delta E_n=0.5\ eV$. The maximum of $f(u)$ occurs between C and 1, giving the maximum contribution to $\exp[f(u)]$ between C and 1 as well.

Figure 4:
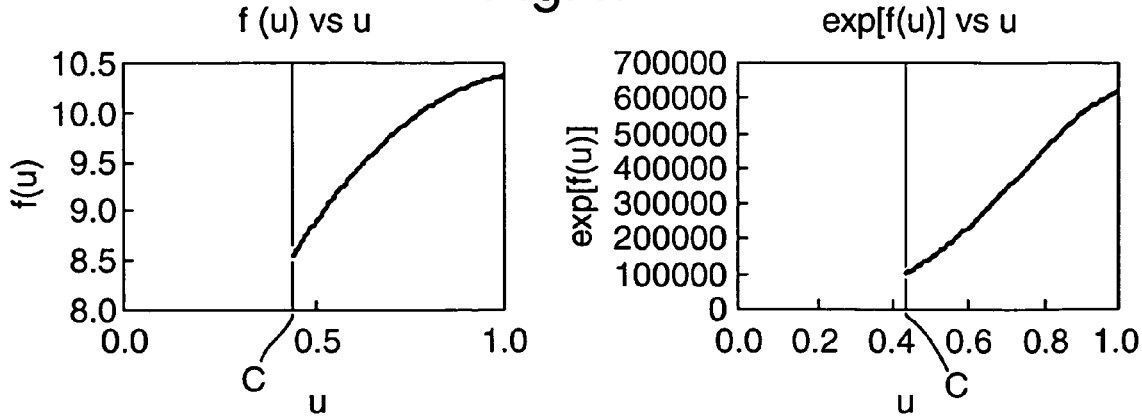
FIG. 4 shows two graphs illustrating a high field condition.

FIG. 4 is based on a high field value (F) of $F=1\times10^8 Vm^{-1}$ for $\Delta E_n=0.5\ eV$. The maximum of $f(u)$ occurs at 1, giving the maximum contribution to $\exp[f(u)]$ at 1 as well.

In a practical implementation it is convenient to consider Case 2 first. That is to determine the $u_{max}$ for maximum $f(u)$ between C and 1. If $u_{max}$ is less than C, then the condition of Case 1 is met. If $u_{max}$ is more than 1 then the condition of Case 3 is met. Using a Taylor's series expansion, $f(u)$ can be approximated by a second-order series expansion around v, where v=(C+1)/2 as a reasonable estimate of where $u_{max}$ is likely to occur. Thus is derived Eqn. (7), assuming $f(v)$ is as set out in Eqn. (8) and $f'(v)$ and $f''(v)$ are as set out in Eqn. (9) and Eqn. (10) respectively. Further, this enables $f(u)$ to be rewritten as in Eqn. (11).

From Eqn. (11), $f(u)$ can be differentiated once and the expression equated to zero, to obtain a stationary point, thus following the Eqn.s (12) to obtain a value for $u_{max}$. If this value of $u_{max}$ is less than C then Case 1 exists. Then it is permissible to set v=C since that is where the maximum $f(u)$ occurs. Then a second order Taylor's series expansion is performed about v=C. All of the necessary equations have been established, so it is only necessary to set v=C in the simulator when $u_{max}$ is less than C, so as to obtain an approximate second order expansion of $f(u)$ about C.

If $u_{max}$, is between C and 1, Case 2 exists. In this condition, it is only necessary to set $v=u_{max}$ in the simulator, so as to obtain an approximate second order expansion of $f(u)$ about $u_{max}$. Here, of course, $v=U_{max}$ is no longer assumed to be equal to (C+1)/2.

If $u_{max}$ is more than 1, Case 3 exists. In this condition, it is only necessary to set v=1 in the simulator, so as to obtain an approximate second order expansion of $f(u)$ about 1.

With the appropriate value of v determined, Eqn. (11) is simplified to lead to Eqn. (13), where AI, AII and AIII are as set out in Eqn. (14), Eqn. (15) and Eqn. (16) respectively.

Completing the square on Eqn. (13) leads to Eqn. (17) and substituting Eqn. (17) into Eqn. (5) gives Eqn. (18). Next a value for t is assigned according to Eqn. (19) and for $t_l$, and $t_u$ when u=C and u=1 according to Eqn. (20) and Eqn. (21) respectively. The value of du is as shown by Eqn. (22).

Substitution of Eqn.s (19–22) in to Eqn. (18) leads to Eqn. (23). However, Eqn. (24) is known and a rational approximation thereof gives the function erf(x) as set out in Eqn. (25) with the values of t, $a_1$, $a_2$, $a_3$, $a_4$, $a_5$ and p as shown.

From Eqn. (24) is finally derived the approximated tunnelling integral according to the method of this embodiment of the present invention and as shown in Eqn. (26), with the values for AI, AII, AIII, $t_l$, $t_u$, $f(v)$, $f'(v)$, $f''(v)$, A, B, C, and D as shown. The values of v noted above for Case 1, 2 and 3 are also listed for Eqn. (26) as is $u_{max}$ for v=(C+1)/2. Of course, $u_{max}$ is solved first in order to determine which of Cases 1, 2 and 3 apply.

An additional term should be respectively added or subtracted in Eqn. (26), as shown in Eqn. (27), if ($t_u>0$ & $t_l<0$) or ($t_u<0$ & $t_l>0$).

The present invention enables a commercial and practicable implementation of an automated simulation method for determining enhanced generation recombination rate due to trap-to-band tunnelling in a semiconductor device using the Dirac coulombic tunnelling integral. Moreover, the present invention can provide high levels of accuracy in the automated modelling of the enhanced generation-recombination rate due to trap-to-band tunnelling in a semiconductor device. The method can be implemented in a two-dimensional finite element package.

Figure 1:
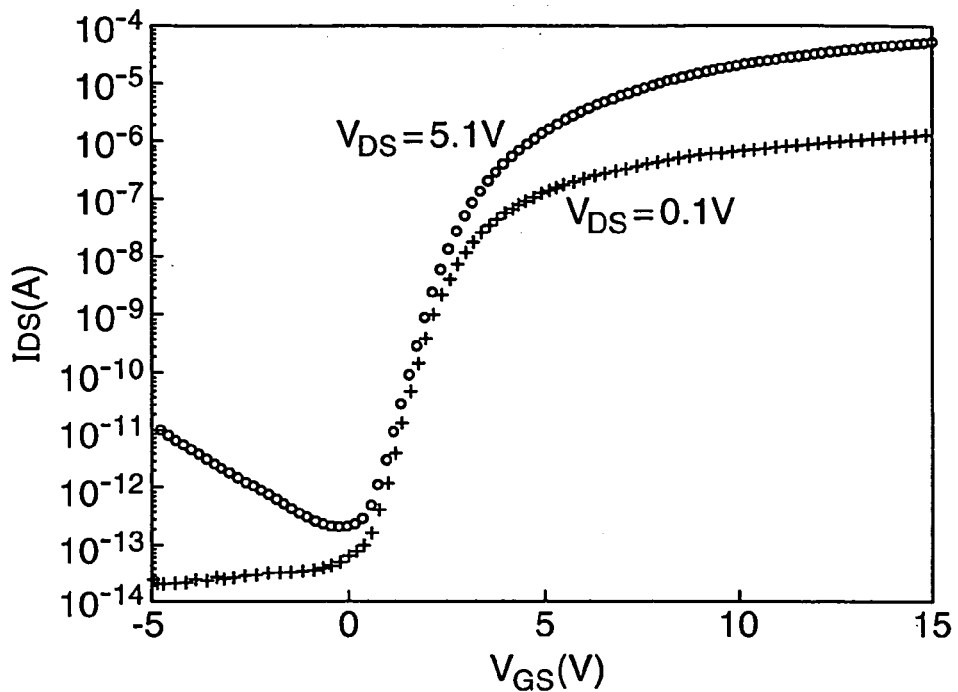
FIG. 1 is a graph illustrating leakage current in a TFT.
Figure 5:
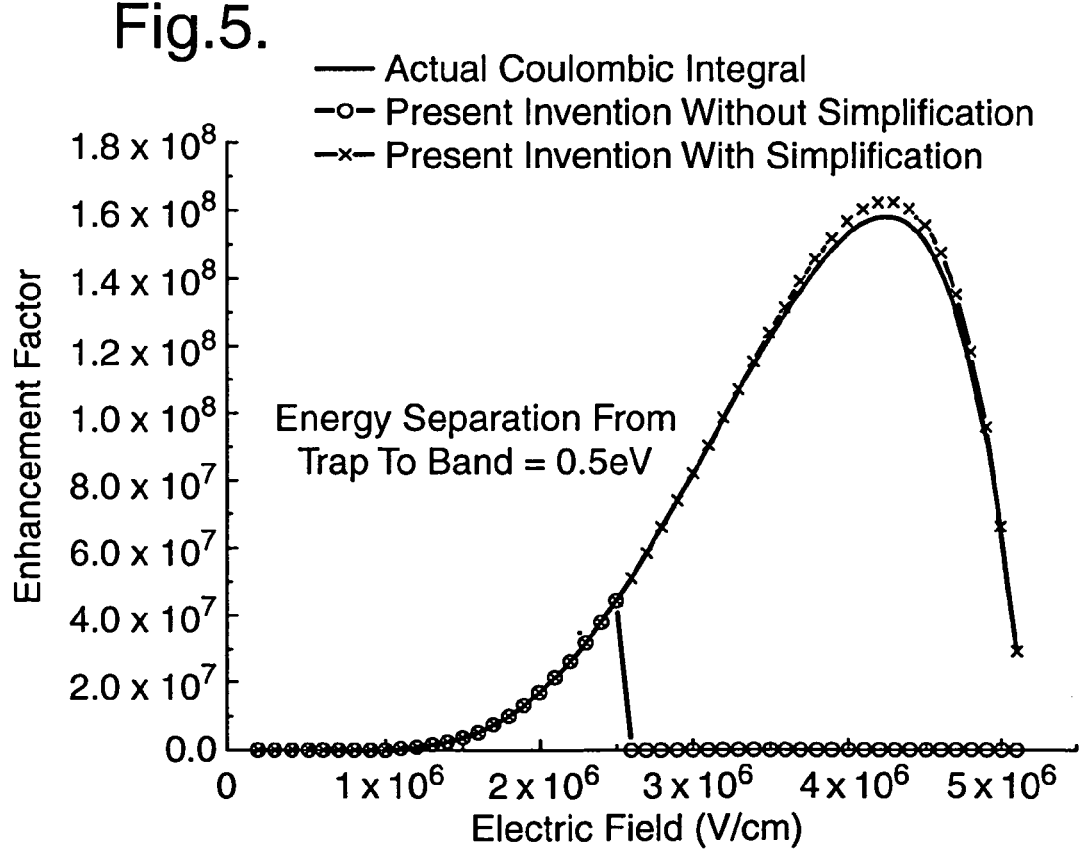
FIG. 5 is a graph illustrating the performance of the present invention.

The present invention uses the characteristics of low, moderate and high field regions with a Taylor's series expansion and a reduction to one or more error functions. Rational approximations are applied to the error functions so as to provide reduction to simple exponential functions. The metod enables cancelling of higher order terms in the exponential functions which otherwise cause premature overflow errors. This enables a much wider range to be calculated, as shown in FIG. 5.

Figure 6:
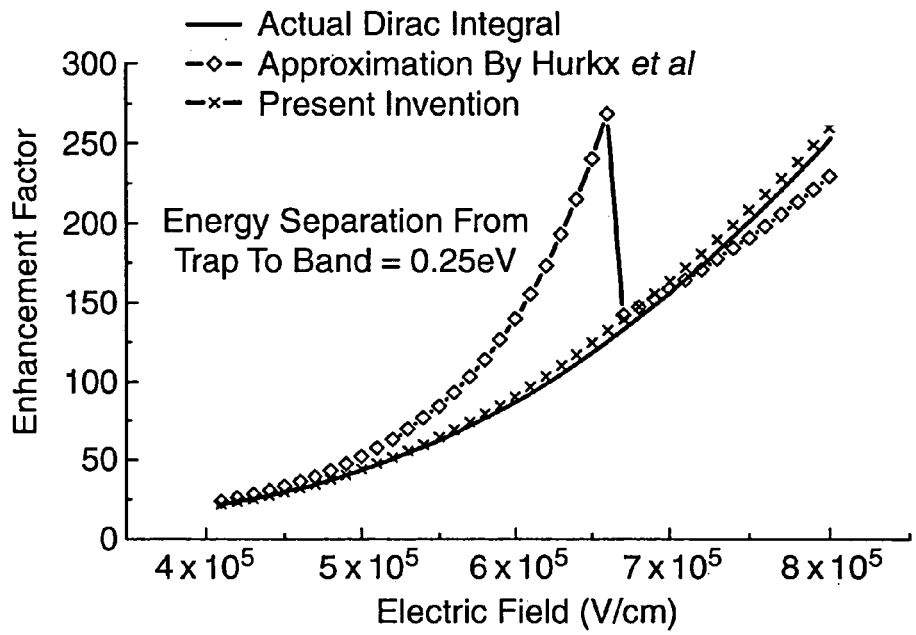
FIG. 6 is a graph illustrating the performance of the present invention.

The method of the invention enables the easy application of proper integration limits so as to ensure a smoth transition between low, moderate and high fields. The effect of removing discontinuities between the low, moderate and high field regions by avoiding conventional simplifications of the integration limits is illustrated in FIG. 6.

Figure 7:
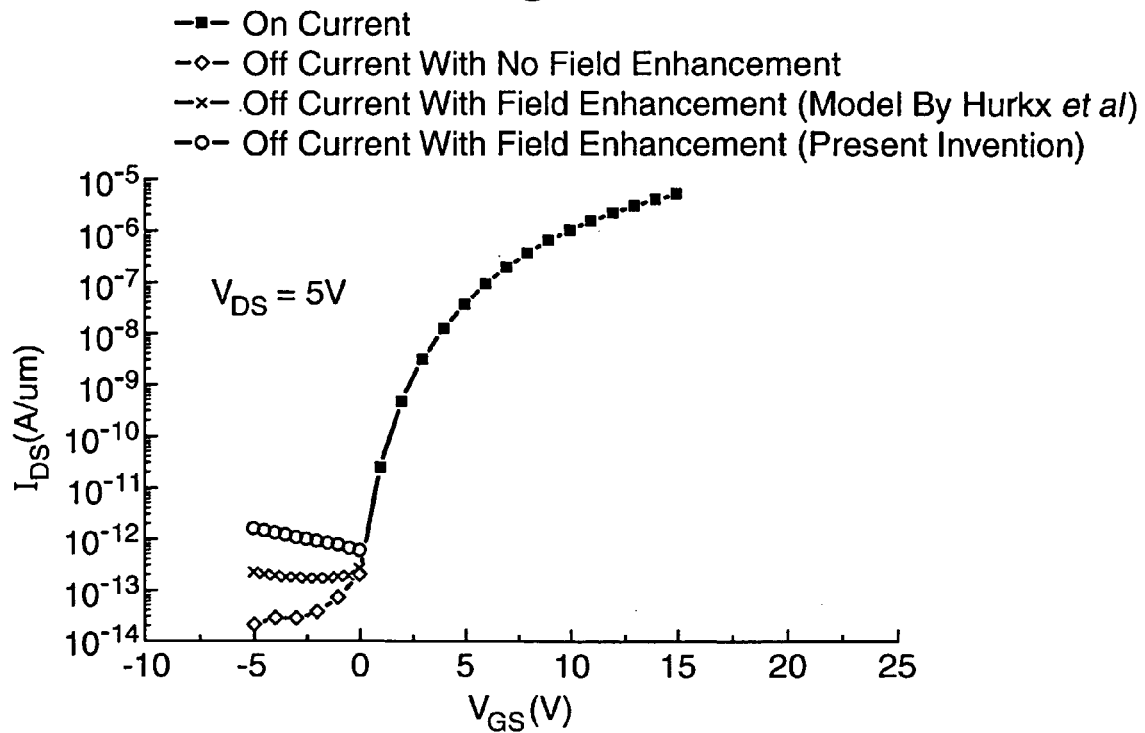
FIG. 7 is a graph illustrating the performance of the present invention.

FIG. 7 illustrates actual results of an implementation of the present invention for an n-channel polysilicon TFT as compared with the standard SRH model (no field enhancement) and the 1992 model by Hurkx et al. It is also to be noted that the implementation of the present invention more accurately simultes the leakage current at low field values (see FIG. 8 at $V_{DS}=0.1V$).

What is claimed is:

1. An automated simulation method for determining enhanced generation recombination rate due to trap-to-band tunnelling in a semiconductor device using the Dirac coulombic tunnelling integral, comprising the steps of:

assigning the variable C to the ratio of the Poole-Frenkel barrier lowering energy ($\Delta E_{fp}$) divided by the energy range for which tunnelling can occur ($\Delta E_n$);

assigning the value (C+1)/2 to a variable v and performing a second order Taylor's series expansion of the Dirac coulombic tunnelling integral around v to determine a maximum value ($u_{max}$) for the variable u of the integral;

determining if the value for $u_{max}$, is less than C, is between C and 1 or is more than 1;

assigning the value of C to the variable v if $u_{max}$ is less than C;

assigning the value of $U_{max}$ to the variable v if $u_{max}$ is between C and 1;

assigning the value of 1 to the variable v if $u_{max}$ is more than 1;

reducing the Taylor's series expansion of the Dirac coulombic tunnelling integral to an error function;

reducing the error function to simple exponential functions by applying rational approximations to the error function; and calculating the enhanced generation recombination rate due to trap-to-band tunnelling in a semiconductor device using the said simple exponential functions;

wherein said method determines the leakage current in a polysilicon Thin Film Transistor.

2. An automated simulation method which determines enhanced generation recombination rate due to trap-to-band tunnelling in a semiconductor device using the approximated tunnelling equation set out below:

$$\int_{t_l}^{t_u} e^{-t^2} dt = \frac{\sqrt{\pi}}{2}[erf(t_u) - erf(t_l)]$$

wherein said method determines the leakage current in a polysilicon Thin Film Transistor.

3. An automated simulation method which determines enhanced generation recombination rate due to trap-to-band tunnelling in a semiconductor device using the approximated tunnelling equation set out below:

$$erf(x)=1-(a_1t+a_2t^2+a_3t^3+a_4t^4+a_5t^5)e^{-x^2},$$

$$t = \frac{1}{1+px},$$

$a_1=0.254829592$;

$a_2=-0.284496736$;

$a_3=1.421413741$;

$a_4=-1.453152027$;

$a_5=1.061405429$;

p=0.3275911;

wherein said method determines the leakage current in a polysilicon Thin Film Transistor.

4. A simulator for determining enhanced generation recombination rate due to trap-to-band tunnelling in a semiconductor device using the Dirac coulombic tunnelling integral, comprising:
  means storing a variable C having a value equal to the ratio of the Poole-Frenkel barrier lowering energy ($\Delta E_{fp}$) divided by the energy range for which tunnelling can occur ($\Delta E_n$);
  means which assign the value (C+1)/2 to a variable v and perform a second order Taylor's series expansion of the Dirac coulombic tunnelling integral around v to determine a maximum value ($u_{max}$) for the variable u of the integral;
  means which determine if the value for $u_{max}$ is less than C, is between C and 1 or is more than 1;
  means which assign the value of C to the variable v if $u_{max}$ is less than C;
  means which assign the value of $u_{max}$ to the variable v if $u_{max}$ is between C and 1;
  means which assign the value of 1 to the variable v if $u_{max}$ is more than 1;
  means storing simple exponential functions derived from applying rational approximations to an error function obtained by reducing the Taylor's series expansion of the Dirac coulombic tunnelling integral; and
  means which calculate the enhanced generation recombination rate due to trap-to-band tunnelling in a semiconductor device using the said simple exponential functions;
  wherein said simulator determines the leakage current in a polysilicon Thin Film Transistor.

5. A simulator which determines enhanced generation recombination rate due to trap-to-band tunnelling in a semiconductor device comprising means which calculate the approximated tunnelling equation set out below:

$$\Gamma_n^{Coul} = \frac{A}{2}\sqrt{\frac{\pi}{AI}}\left(\frac{a_1}{(1+pt_l)} + \frac{a_2}{(1+pt_l)^2} + \frac{a_3}{(1+pt_l)^3} + \frac{a_4}{(1+pt_l)^4} + \frac{a_5}{(1+pt_l)^5}\right)$$

$$\exp(-C^2 AI - CAII - AIII) - \frac{A}{2}\sqrt{\frac{\pi}{AI}}$$

$$\left(\frac{a_1}{(1+pt_u)} + \frac{a_2}{(1+pt_u)^2} + \frac{a_3}{(1+pt_u)^3} + \frac{a_4}{(1+pt_u)^4} + \frac{a_5}{(1+pt_u)^5}\right)$$

$$\exp(-AI - AII - AIII)$$

$$AI = -\frac{f''(v)}{2}, AII = -[f'(v) - vf''(v)], AIII = -\left[v^2\frac{f''(v)}{2} - vf'(v) + f(v)\right],$$

$$t_l = \sqrt{AI}\left(C + \frac{AII}{2AI}\right), t_u = \sqrt{AI}\left(1 + \frac{AII}{2AI}\right),$$

$$f(v) = Av - Bv^{\frac{3}{2}} + Dv^{-\frac{1}{6}},$$

$$f'(v) = A - \frac{3}{2}Bv^{\frac{1}{2}} - \frac{1}{6}Dv^{-\frac{7}{6}},$$

$$f''(v) = -\frac{3}{4}Bv^{-\frac{1}{2}} + \frac{7}{36}Dv^{-\frac{13}{6}},$$

$$A = \frac{\Delta E_n}{kT}, B = K_n, C = \frac{\Delta E_{fp}}{\Delta E_n}, D = BC^{\frac{5}{3}}.$$

v=C(for $U_{max}$<C, case 1),
v=$U_{max}$(for C<$u_{max}$<I, case 2),
v=I(for $U_{max}$≧1, case 3), $$u_{max} = \frac{f'(v) - vf''(v)}{f''(v)} \text{ for } v = \frac{C+1}{2}$$

wherein said simulator determines the leakage current in a polysilicon Thin Film Transistor.

6. A simulator which determines enhanced generation recombination rate due to trap-to-band tunnelling in a semiconductor device comprising means which calculate the approximated tunnelling equation set out below:

$$\Gamma_n^{Coul} =$$

$$\frac{A}{2}\sqrt{\frac{\pi}{AI}}\left(\frac{a_1}{(1+pt_l)} + \frac{a_2}{(1+pt_l)^2} + \frac{a_3}{(1+pt_l)^3} + \frac{a_4}{(1+pt_l)^4} + \frac{a_5}{(1+pt_l)^5}\right)$$

$$\exp(-C^2 AI - CAII - AIII) - \frac{A}{2}\sqrt{\frac{\pi}{AI}}$$

$$\left(\frac{a_1}{(1+pt_u)} + \frac{a_2}{(1+pt_u)^2} + \frac{a_3}{(1+pt_u)^3} + \frac{a_4}{(1+pt_u)^4} + \frac{a_5}{(1+pt_u)^5}\right)$$

$$\exp(-AI - AII - AIII) \pm \frac{A}{2}\sqrt{\frac{\pi}{AI}}\exp\left(-AIII + \frac{AII^2}{4AI}\right)$$

wherein said simulator determines the leakage current in a polysilicon Thin Film Transistor.

7. A method of manufacturing a semiconductor device based on the leakage current estimated by the method according to claim 1.

8. A method of manufacturing a semiconductor device based on the leakage current estimated by the method according to claim 2.

9. A method of manufacturing a semiconductor device based on the leakage current estimated by the method according to claim 3.

* * * * *